US005530569A

United States Patent [19]

[11] Patent Number: 5,530,569

[45] Date of Patent: Jun. 25, 1996

Tsuboyama et al.

[54] FERROELECTRIC LIQUID CRYSTAL DEVICE WITH AC ELECTRIC FIELD PRETREATMENT FOR BISTABILITY

[75] Inventors: Akira Tsuboyama; Yukio Hanyu; Kenji Shinjo, all of Atsugi, Japan

[73] Assignee: Canon Kabushiki Kaisha, Tokyo, Japan

[21] Appl. No.: 419,530

[22] Filed: Apr. 10, 1995

Related U.S. Application Data

[63] Continuation of Ser. No. 33,886, Mar. 18, 1993, abandoned.

[30] Foreign Application Priority Data

Mar. 18, 1992 [JP] Japan .................................... 4-091493

[51] Int. Cl.[6] .................................................... G02F 1/141

[52] U.S. Cl. ................................ 359/56; 359/76; 359/100

[58] Field of Search ................................ 359/56, 85, 100, 359/76, 78

[56] References Cited

U.S. PATENT DOCUMENTS

| | | | |
|---|---|---|---|
| 4,586,791 | 5/1986 | Isogai et al. | 359/76 |
| 4,778,259 | 10/1988 | Kitayama et al. | 350/350 S |
| 4,820,026 | 4/1989 | Okada et al. | 350/341 |
| 4,902,107 | 2/1990 | Tsuboyama et al. | 350/350 S |
| 4,941,736 | 7/1990 | Taniguchi et al. | 359/63 |
| 5,013,137 | 5/1991 | Tsuboyama et al. | 350/333 |
| 5,061,047 | 10/1991 | Bradshaw et al. | 359/101 |
| 5,124,827 | 6/1992 | Davey | 359/100 |
| 5,227,904 | 7/1993 | Nakanowatari | 359/76 |
| 5,327,273 | 7/1994 | Beresnev et al. | 359/100 |

*Primary Examiner*—William L. Sikes
*Assistant Examiner*—Tai V. Duong
*Attorney, Agent, or Firm*—Fitzpatrick Cella Harper & Scinto

[57] ABSTRACT

A ferroelectric liquid crystal device is constituted by a pair of oppositely spaced substrates each having an electrode thereon, and a layer of ferroelectric liquid crystal disposed between the substrates. The ferroelectric liquid crystal is disposed in a thickness sufficiently large to retain its helical structure in its as-injected state but is placed in a non-helical structure showing bistability by application of an AC electric field to the liquid crystal layer prior to a routine drive for normal optical modulation by application of external drive voltage signals.

2 Claims, 1 Drawing Sheet

FERROELECTRIC LIQUID CRYSTAL DEVICE WITH AC ELECTRIC FIELD PRETREATMENT FOR BISTABILITY

This application is a continuation of application Ser. No. 08/033,886, filed Mar. 18, 1993, now abandoned.

FIELD OF THE INVENTION AND RELATED ART

The present invention relates to a ferroelectric liquid crystal device used in image-display apparatus, etc., and an alignment control method therefor.

A device using a surface-stabilized ferroelectric liquid crystal (hereinafter referred to as "SSFLC") proposed by Clark and Lagerwall utilizes a bistability and a memory characteristic of SSFLC and can realize a display and an optical shutter of a large-capacity, a high-definition and a high quality according to a simple matrix drive scheme.

A liquid crystal device generally has a structure comprising a pair of substrates each provided with electrodes, oppositely spaced from each other with a certain gap therebetween and sealed along their periphery to form a cell, which is filled with a liquid crystal. The liquid crystal sandwiched between the substrates is caused to change its alignment states depending on voltages applied across the electrodes, and the change in alignment is utilized to effect a display, etc. For this purpose, the electrodes are generally covered with an alignment control film for controlling the alignment of the liquid crystal.

According to our study, however, in order to realize. SSFLC, it is necessary to provide a very small cell thickness (liquid crystal layer thickness), more specifically, a layer of ferroelectric liquid crystal (hereinafter sometimes abbreviated as "FLC") in a thickness of 2 μm or less, desirably 1.5 μm or less. It is however very difficult to control such a small cell thickness over a large area.

Further, as an FLC in a smectic phase has a molecular layer structure, it is very difficult to obtain a monodomain in a strict sense. For the alignment control of FLC, an alignment control film of an organic polymer subjected to rubbing has been ordinarily used. Such an alignment film is, however, liable to result in various alignment defects in the resultant liquid crystal layer because of various factors involved in the process, such as fluctuations in temperature, humidity, mechanical precision and conditions for forming the organic polymer film. As a result, in case of the production of a display device, for example, the resultant display device is liable to cause a display irregularity due to a difference in alignment state or a deviation of liquid crystal optical axis, thus resulting in a difficulty in enlargement of a display device size.

SUMMARY OF THE INVENTION

Accordingly, an object of the present invention is to provide a ferroelectric liquid crystal device with an improved alignment state.

Another object of the present invention is to provide an alignment control method for providing such a ferroelectric liquid crystal device.

More specifically, in the present invention, prior to a routine drive of a liquid crystal device for image display or during an interruption period between such routine drives for image display, a prescribed pre-treatment is applied to a liquid crystal device to provide a bistability required for satisfactory multiplex driving through alleviation of alignment failure and improvement in switching characteristic without lowering the productivity of the device.

More specifically, according to the present invention, the present invention, there is provided a ferroelectric liquid crystal device, comprising a pair of oppositely spaced substrates each having an electrode thereon, and a layer of ferroelectric liquid crystal disposed between the substrates, wherein said ferroelectric liquid crystal is disposed in a thickness sufficiently large to retain its helical structure in its as-injected state but is placed in a non-helical structure showing bistability by application of an AC electric field to the liquid crystal layer prior to a routine drive for normal optical modulation by application of external drive voltage signals.

According to another aspect of the present invention, there is provided an alignment control method for providing such a ferroelectric liquid crystal device.

These and other objects, features and advantages of the present invention will become more 10 apparent upon a consideration of the following description of the preferred embodiments of the present invention taken in conjunction with the accompanying drawings.

DESCRIPTION OF THE PREFERRED EMBODIMENTS

Figure 1:
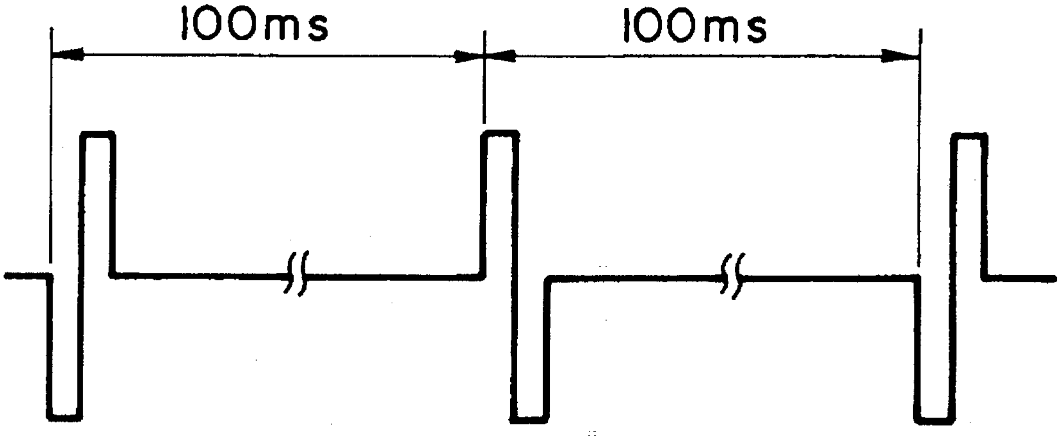
FIG. 1 shows a pulse waveform of bipolar pulses applied to a liquid crystal device according to an embodiment of the present invention for evaluation of optical response characteristic.

In the present invention, the above-mentioned AC electric field application may be performed in a period prior to a routine drive for normal optical modulation, such as image display or optical-shutter operation, (in a sense inclusive of a pause period between two successive routine drives). For example, the AC electric field application may be performed as a final step during the device production or during an interrupting period between two successive routine drives for normal optical modulation.

In the present invention, the ferroelectric liquid crystal is disposed in a layer thickness sufficiently large to retain its helical structure in its as-injected state prior to any electric field application, i.e., in a thickness larger than its own helical pitch developed in its bulk state. In the above-mentioned SSFLC device, the FLC is disposed in a layer thin enough to develop a non-helical structure thereby obtaining bistability. In contrast thereto, in the present invention, bistability is obtained by the above-mentioned AC electric field application, so that the FLC layer thickness can be set to a value large enough to allow easy control during the device production process. More specifically, the FLC layer thickness may be set within a range of 1–100 μm, preferably 1–50 μm, with the proviso that it is larger than the helical pitch of the FLC.

The aligning treatment method requires only applying an AC electric field across the liquid crystal layer between the electrodes prior to voltage drive for image display or during interruption of the voltage application for image display for a certain period. The above electrodes may be those provided to the device for a routine drive. Accordingly, substantially no special device is required for the AC electric field application. The AC electric field should have sufficiently large amplitude and cycle to cause switching of the FLC, and the AC electric field application should be continued for a period sufficient to saturate the application effect. More specifically, the AC electric may preferably have a frequency of 1–10 kHz and an amplitude of ±5 to ±100 volts and be continued for a period of 5 seconds to 5 minutes.

The molecular mechanism of unwinding the helical structure and realignment of the FLC caused by the AC electric field application has not been fully clarified yet but it may be assumed that a sufficient torque is applied to the liquid crystal molecules from outside to align. The molecules in one direction in the layer. The effect of the AC electric field application is persistent to some extent after the removal of the AC electric field.

EXAMPLE 1

In a specific example, a liquid crystal device was prepared in the following manner.

Two 1.1 mm,thick glass plates each provided with a 1000 Å-thick ITO electrode were respectively coated with a 300 Å-thick polyimide film (by application and baking of a polyimide precursor ("SP- 710", mfd. by Toray K.K.)) followed by rubbing in one direction. The thus-treated two substrates were applied to each other with a gap of 20 μm therebetween so that their rubbing directions were parallel to each other, and the periphery thereof were sealed to form a cell, which was then filled with a phenyl ester-based mixture FLC material showing the following phase transition series and parameters and heated to an isotropic temperature of 90° C.

$$\text{Cryst.} \xrightarrow{20^\circ\,\text{C.}} \text{SmC*} \xrightarrow{51^\circ\,\text{C.}} \text{SmA} \xrightarrow{63^\circ\,\text{C.}} \text{Ch.} \xrightarrow{80^\circ\,\text{C.}} \text{Iso.}$$

Spontaneous polarization Ps=100 nC/cm$^2$ (30° C.)

Cone angle Ⓗ=23 degrees

The cell filled with FLC, after being sealed up, was gradually cooled at a rate of 1° C./min and observed through a cross-nicol polarizing microscope at a room temperature (30° C.), whereby a typical fringe-pattern texture corresponding to a helical pitch of the liquid crystal was observed extending perpendicularly to the rubbing direction.

Then, between the electrodes of the device, an AC electric field of ±50 volts and 100 Hz was applied for one minute, whereby the fringe-pattern texture disappeared. Thus, the helical structure was believed to have disappeared in the liquid crystal layer.

Figure 2:
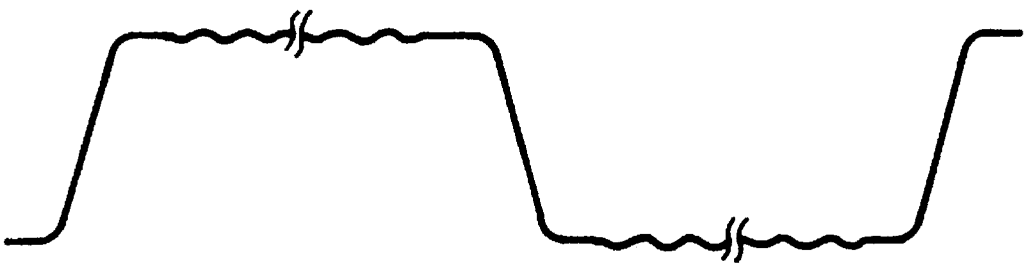
FIG. 2 is a waveform diagram showing an optical response of the device.

Further, the liquid crystal device was supplied with bipolar voltage pulses shown in FIG. 1 to observe an optical response of the liquid crystal, whereby the liquid crystal showed a response as shown in FIG. 2. The resultant states were retained in the absence of such an electric field application, and thus a bistability was confirmed and an applicability to a high-duty multiplex drive was also confirmed.

EXAMPLE 2

A liquid crystal device was prepared and evaluated in the same manner as in Example 1 except that 500 Å-thick polyvinyl alcohol alignment films were formed instead of the polyimide alignment films.

As a result of the AC electric field application, the liquid crystal device showed a fringe pattern-free, good alignment state and good optical responsive characteristic similarly as in Example 1.

EXAMPLE 3

A liquid crystal device was prepared and evaluated in the same manner as in Example 1 except that the polyimide alignment films were replaced by 200 Å-thick polyimide films formed by application and baking of a polyimide precursor ("RN-150", mfd. by Nissan Kagaku K.K.)

As a result of observation of an alignment state through the polarizing microscope, the liquid crystal in the device after the injection and cooling showed a fringe-pattern texture attributable to a helical pitch of the liquid crystal in a direction perpendicular to the rubbing direction and also a deviation of the fringe pattern within a range of ±20 degrees from the perpendicular direction. This was understood that the liquid crystal smectic layer structure caused a deviation and the initial alignment was poor in alignment homogeneity.

Then, the liquid crystal device was supplied with an AC electric field of ±50 volts and 100 Hz for 1 min., whereby the fringe pattern disappeared. Further, when the liquid crystal device was rotated relative to the cross nicol polarizers of the polarizing microscope, a complete extinction state was confirmed. Further, the above-mentioned deviation in layer structure was also confirmed to have disappeared.

The liquid crystal device after the AC electric field application treatment showed good optical response characteristic similarly as in Example 1 and was also confirmed to show applicability to a high-duty multiplex drive.

As described hereinabove, according to the present invention, a ferroelectric liquid crystal device containing a ferroelectric liquid crystal retaining its helical pitch and thus lacking bistability or accompanied with ununiform alignment in the state after liquid crystal injection or during a drive interruption period can be provided with bistability to show good multiplex drive characteristics by a prescribed AC application pretreatment. As a result, according to the present invention, the aligning treatment and cell-thickness control which have been considered as most difficult in the liquid crystal cell production process are facilitated, whereby the liquid crystal cell production can be performed at a good productivity.

What is claimed is:

1. A ferroelectric liquid crystal device, comprising a pair of oppositely spaced substrates each having an electrode thereon, and a layer of ferroelectric liquid crystal having chiral smectic phase disposed between the substrates, wherein said ferroelectric liquid crystal is disposed in a thickness sufficiently large to retain its helical structure of the chiral smectic phase in its as-injected state but is placed in a non-helical structure showing bistability in the chiral smectic phase by application of an AC electric field to the liquid crystal layer prior to a routine drive for normal optical modulation by application of external drive voltage signals.

2. An alignment control method, comprising:

providing a ferroelectric liquid crystal device comprising a pair of oppositely spaced substrates each having an electrode thereon, and a layer of ferroelectric liquid crystal having chiral smectic phase disposed between the substrates in a thickness sufficient to retain its helical structure of the chiral smectic phase in its as-injected state, and applying an AC electric field to the liquid crystal layer to place the ferroelectric liquid crystal in a non-helical structure showing bistability in the chiral smectic phase prior to a routine drive for normal optical modulation by application of external drive voltage signals.

* * * * *